(12) United States Patent
Hu et al.

(10) Patent No.: US 12,118,988 B2
(45) Date of Patent: Oct. 15, 2024

(54) TRANSDUCER-BASED STREAMING DELIBERATION FOR CASCADED ENCODERS

(71) Applicant: Google LLC, Mountain View, CA (US)

(72) Inventors: Ke Hu, Stony Brook, NY (US); Tara N. Sainath, Jersey City, NJ (US); Arun Narayanan, Santa Clara, CA (US); Ruoming Pang, New York, NY (US); Trevor Strohman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 254 days.

(21) Appl. No.: 17/933,307

(22) Filed: Sep. 19, 2022

(65) Prior Publication Data
US 2023/0109407 A1    Apr. 6, 2023

Related U.S. Application Data

(60) Provisional application No. 63/262,089, filed on Oct. 4, 2021.

(51) Int. Cl.
*G10L 15/197* (2013.01)
*G06F 40/126* (2020.01)
(Continued)

(52) U.S. Cl.
CPC .......... *G10L 15/197* (2013.01); *G06F 40/126* (2020.01); *G10L 15/02* (2013.01);
(Continued)

(58) Field of Classification Search
CPC ..... G10L 15/197; G10L 15/02; G10L 15/063; G10L 15/083; G10L 15/22; G10L 15/183;
(Continued)

(56) References Cited

U.S. PATENT DOCUMENTS

| 2021/0225362 A1* | 7/2021 | Sainath | .................... G06N 3/08 |
| 2021/0225369 A1* | 7/2021 | Hu | .......................... G10L 15/32 |

(Continued)

OTHER PUBLICATIONS

Hu et al. (Transducer-Based Streaming Deliberation for Cascaded Encoders), May 23-27, 2022 https://ieeexplore.ieee.org/document/9746406 (Year: 2022).*

(Continued)

*Primary Examiner* — Yogeshkumar Patel
(74) *Attorney, Agent, or Firm* — Honigman LLP; Brett A. Krueger; Grant Griffith

(57) ABSTRACT

A method includes receiving a sequence of acoustic frames and generating, by a first encoder, a first higher order feature representation for a corresponding acoustic frame in the sequence of acoustic frames. The method also includes generating, by a first pass transducer decoder, a first pass speech recognition hypothesis for a corresponding first higher order feature representation and generating, by a text encoder, a text encoding for a corresponding first pass speech recognition hypothesis. The method also includes generating, by a second encoder, a second higher order feature representation for a corresponding first higher order feature representation. The method also includes generating, by a second pass transducer decoder, a second pass speech recognition hypothesis using a corresponding second higher order feature representation and a corresponding text encoding.

24 Claims, 5 Drawing Sheets

(51) Int. Cl.
*G10L 15/02* (2006.01)
*G10L 15/06* (2013.01)
*G10L 15/08* (2006.01)
*G10L 15/22* (2006.01)

(52) U.S. Cl.
CPC .......... *G10L 15/063* (2013.01); *G10L 15/083* (2013.01); *G10L 15/22* (2013.01)

(58) Field of Classification Search
CPC ............. G10L 15/16; G10L 2015/0635; G06F 40/126; G06N 3/045; G06N 3/048; G06N 3/044; G06N 3/0455; G06N 3/0464
See application file for complete search history.

(56) References Cited

U.S. PATENT DOCUMENTS

| | | | |
|---|---|---|---|
| 2021/0312905 A1* | 10/2021 | Zhao | G10L 15/16 |
| 2021/0312914 A1* | 10/2021 | Hedayatnia | G10L 19/00 |
| 2022/0405549 A1* | 12/2022 | Sim | G10L 15/22 |

OTHER PUBLICATIONS

Hu et al. (Transformer Based Deliberation for Two-Pass Speech Recognition), Jan. 19-22, 2021 https://ieeexplore.ieee.org/abstract/document/9383497 (Year: 2021).*
International Search Report and Written Opinion relating to application PCT/US2022/076659, dated Dec. 6, 2022.
Hu Ke et al: "Transducer-Based Streaming Deliberation for Cascaded Encoders", ICASSP 2022—2022 IEEE International Conference on Acoustics, Speech and Signal Processing (ICASSP), IEEE, May 23, 2022 (May 23, 2022), pp. 8107-8111, XP034156844, DOI: 10.1109/ICASSP43922.2022.9746406 [retrieved on Apr. 27, 2022] figure 1 sections 2, 3.1.
Hu Ke et al: "Transformer Based Deliberation for Two-Pass Speech Recognition", 2021 IEEE Spoken Language Technology Workshop (SLT), Jan. 19, 2021 (Jan. 19, 2021), pp. 68-74, XP093000484, DOI: 10.1109/SLT48900.2021.9383497 ISBN: 978-1-7281-7066-4 Retrieved from the Internet: URL:<https://ieeexplore.ieee.org/stampPDF/g>etPDF.jsp?tp=&arnumber=9383497&ref=aHR0cHM6Ly9pZWVleHBsb3JlLml1ZWUub3Jnla2Fic3RyYWN0L2RvY3VtZW50Lzkz.

* cited by examiner

TRANSDUCER-BASED STREAMING DELIBERATION FOR CASCADED ENCODERS

CROSS REFERENCE TO RELATED APPLICATIONS

This U.S. patent application claims priority under 35 U.S.C. § 119(e) to U.S. Provisional Application 63/262,089, filed on Oct. 4, 2021. The disclosure of this prior application is considered part of the disclosure of this application and is hereby incorporated by reference in its entirety.

TECHNICAL FIELD

This disclosure relates to transducer-based streaming deliberation for cascaded encoders.

BACKGROUND

Automated speech recognition (ASR) systems have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. That is, a fully neural network function without external and/or manually designed components (e.g., finite state transducers, a lexicon, or text normalization modules). Additionally, when training E2E models, these models generally do not require bootstrapping from decision trees or time alignments from a separate system. These E2E ASR systems have made tremendous progress, surpassing conventional ASR systems in several common benchmarks including word error rates (WER). For instance, a number of applications that involve user interaction, such as voice-search or on-device dictation, require the model to perform recognition in a streaming fashion. Other applications, like offline video captioning, do not require the model to be streaming and can make use of future context to improve performance. Oftentimes, it would be beneficial for a model to perform recognition in a streaming fashion while also having improved performance similar to non-streaming models that make use of the future context.

SUMMARY

One aspect of the disclosure provides a transducer-based deliberation model for cascaded encoders that includes a first encoder configured to receive a sequence of acoustic frames as input and generate, at each of a plurality of output steps, a first higher order feature representation for a corresponding acoustic frame in the sequence of acoustic frames. The transducer-based deliberation model also includes a first pass transducer decoder configured to receive, as input, the first higher order feature representation generated by the first encoder at each of the plurality of output steps and generate, at each of the plurality of output steps, a first pass speech recognition hypothesis for a corresponding first higher order feature representation. The transducer-based deliberation model also includes a text encoder configured to receive, as input, the first pass speech recognition hypothesis generated at each of the plurality of output steps and generate, at each of the plurality of output steps, a text encoding for a corresponding first pass speech recognition hypothesis. The transducer-based deliberation model also includes a second encoder configured to receive, as input, the first higher order feature representation generated by the first encoder at each of the plurality of output steps and generate, at each of the plurality of output steps, a second higher order feature representation for a corresponding first higher order feature representation. The transducer-based deliberation model also includes a second pass transducer decoder configured to receive, as input, the second higher order feature representation generated by the second encoder at each of the plurality of output steps and the text encoding generated by the text encoder at each of the plurality of output steps and generate, at each of the plurality of output steps, a second pass speech recognition hypothesis.

Implementations of the disclosure may include one or more of the following optional features. In some implementations, the transducer-based deliberation model further includes a prediction network shared by the first pass transducer decoder and the second pass transducer decoder. Here, the prediction network is configured to receive, as input, a sequence of non-blank symbols output by a final softmax layer and generate, at each of the plurality of output steps, a dense representation. In these implementations, the second pass transducer decoder further includes a joint network configured to: receive, as input, the dense representation generated by the prediction network at each of the plurality of output steps, the second higher order feature representation generated by the second encoder at each of the plurality of output steps, and the text encoding generated by the text encoder at each of the plurality of output steps; and generate, at each of the plurality of output steps, the second pass speech recognition hypothesis.

In some examples, the second encoder generates the second higher order feature representation without receiving any of the acoustic frames as input. The first encoder may include a causal encoder that includes a stack of multi-headed attention layers. The stack of multi-headed attention layers may include a stack of Conformer layers. In some implementations, the second encoder includes a non-causal encoder that includes a stack of multi-headed attention layers. In these implementations, the stack of multi-headed attention layers may include a stack of Conformer layers. The second pass transducer decoder may train without using any text-only data.

In some examples, receiving the text encoding generated by the text encoder at each of the plurality of output steps includes receiving a partial sequence of the text encoding in a streaming fashion. In these examples, the second pass transducer decoder may further includes a joint network configured to determine an attention context vector between the partial sequence of the text encoding and a corresponding portion of the second higher order feature representation. The first and second pass speech recognition hypotheses may each correspond to a partial speech recognition result.

Another aspect of the disclosure provides a computer-implemented method that when executed on data processing hardware causes the data processing hardware to perform operations for transducer-based streaming deliberation for cascaded encoders. The operations include receiving a sequence of acoustic frames and generating, by a first encoder, a first higher order feature representation for a corresponding acoustic frame in the sequence of acoustic frames at each of a plurality of output steps. The operations also include generating, by a first pass transducer decoder, a first pass speech recognition hypothesis for a corresponding first higher order feature representation at each of the plurality of output steps. The operations also include generating, by a text encoder, a text encoding for a corresponding first pass speech recognition hypothesis at each of the plurality of output steps and generating, by a second encoder, a second higher order feature representation for a corresponding first higher order feature representation at each of the plurality of output steps. The operations also include generating, by a second pass transducer decoder, a second pass speech recognition hypothesis using a corresponding second higher order feature representation and a corresponding text encoding at each of the plurality of output steps.

Implementations of the disclosure may include one or more of the following optional features. In some implementations, the operations further include generating, by a prediction network based on a sequence of non-blank symbols output by a final softmax layer, a dense representation at each of the plurality of output steps. Here, the first pass transducer decoder and the second pass transducer decoder share the prediction network. In some examples, the operations further include generating, by a joint network at each of the plurality of output steps, the second pass speech recognition hypothesis based on the dense representation generated by the prediction network at each of the plurality of output steps, the second higher order feature representation generated by the second encoder at each of the plurality of output steps, and the text encoding generated by the text encoder at each of the plurality of output steps. The second encoder may generate the second higher order feature representation without receiving any of the acoustic frames as input.

In some implementation, the first encoder includes a causal encoder that includes a stack of multi-headed attention layers. In these implementations, the stack of multi-headed attention layers includes a stack of conformer layers. In some examples, the second encoder includes a non-causal encoder that includes a stack of multi-headed attention layers. In these examples, the stack of multi-headed attention layers includes a stack of conformer layers. The second pass transducer decoder may train without using any text-only data. In some implementations, receiving the text encoding includes receiving a partial sequence of the text encoding in a streaming fashion. In these implementations, the operations may further include determining, by a joint network, an attention context vector between the partial sequence of the text encoding and a corresponding portion of the second higher order feature representation. The first and second pass speech recognition hypotheses may each correspond to a partial speech recognition result.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

End-to-end (E2E) automatic speech recognition (ASR) models are traditionally structured to operate in either a streaming mode or a non-streaming mode. Conventionally, an E2E ASR model includes an encoder and a decoder as the main components. Applications that involve end-user interaction, like voice-search or on-device dictation, may require the model to perform recognition in a streaming fashion. Here, performing recognition in a streaming fashion refers to the ASR model outputting each word of an utterance as they are spoken with as little latency as possible. Other applications, like offline video captioning, do not require the model to be streaming and can make use of future context to improve performance. For example, deliberation models show great improvements on rare word and out-of-vocabulary (OOV) word recognition when compared to long short-term memory (LSTM) or transformer rescoring models. In particular, deliberation models excel at correcting initial speech recognition results by using an attention mechanism and looking at a full audio context. However, these deliberation models use attention decoders that increase latency of the ASR models making the deliberation models less suitable for streaming applications.

Implementations herein are directed towards a transducer-based deliberation ASR model for cascaded encoders. In particular, the ASR model includes a first encoder that generates a first higher order feature representation for a corresponding acoustic frame and a first pass transducer decoder that generates a first pass speech recognition hypothesis for a corresponding first higher order feature representation. The ASR model also includes a text encoder that generates a text encoding for a corresponding first pass speech recognition hypothesis. Moreover, a second encoder generates a second higher order feature representation for the corresponding first higher order feature representation and a second pas transducer decoder generates a second pass speech recognition hypothesis. Notably, the transducer-based deliberation ASR model is a deliberation model that operates in a streaming fashion because the transducer decoder only requires a partial first pass speech recognition hypothesis to generate the second pass speech recognition hypothesis. In contrast, current deliberation models use an attention decoder during the second pass that requires a complete first pass speech recognition hypothesis before generating a second pass speech recognition hypothesis. Moreover, the transducer-based deliberation ASR model does not require any text-only training day during training.

Figure 1:
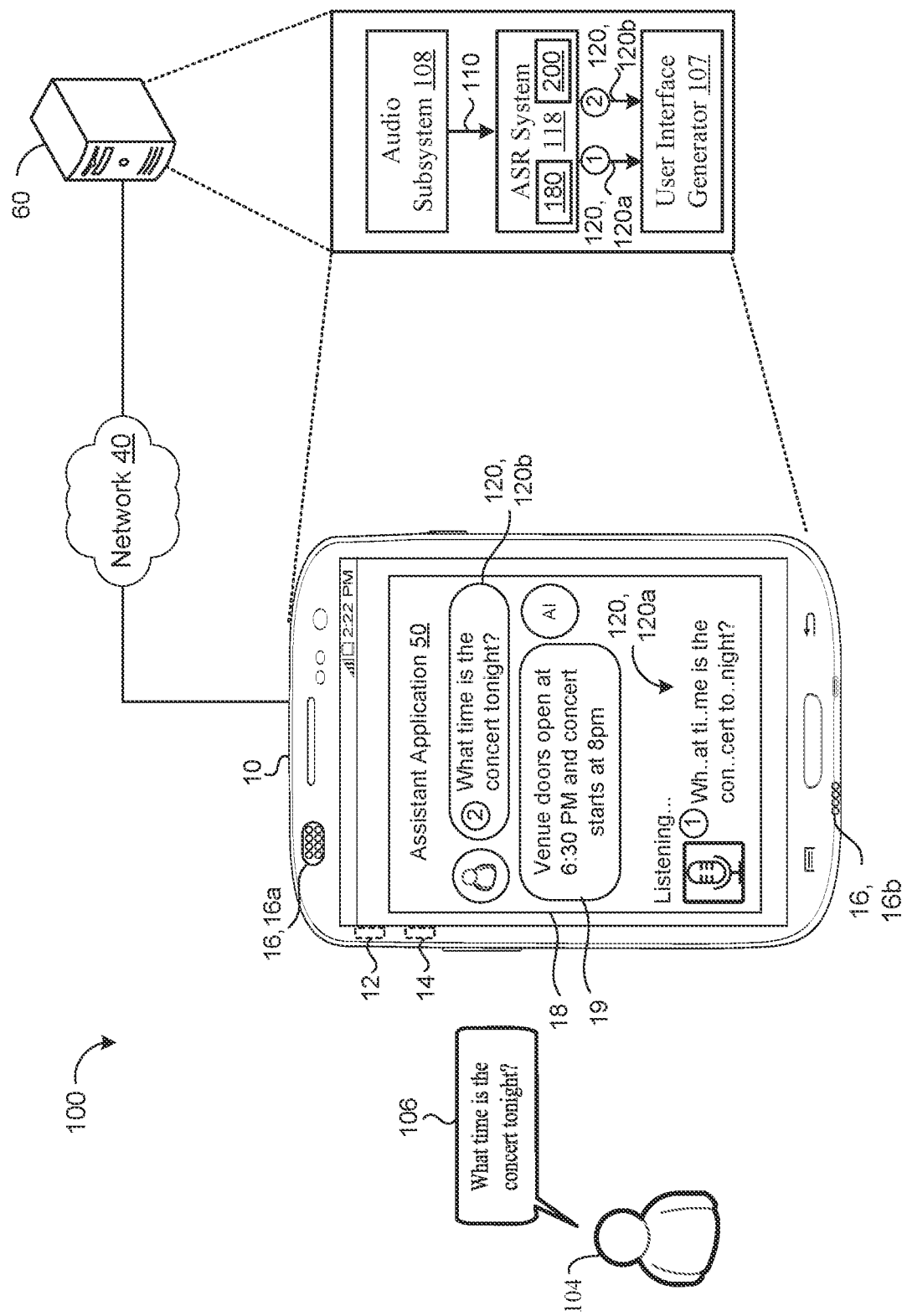
FIG. 1 is a schematic view of an example speech recognition system.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the user device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implements an ASR model 200 and resides on the user device 10 of the user 104 and/or on a remote computing device 60 (e.g., one or more remote servers of a distributed system executing in a cloud-computing environment) in communication with the user device 10 via a network 40. In some examples, the ASR model 200 may be a recurrent neural network-transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model receives (e.g., processes) each acoustic frame 110 in the sequence of acoustic frames 110.

In the example shown, the ASR model 200 may perform streaming speech recognition to produce a first pass speech recognition hypothesis (e.g., initial speech recognition result) 120, 120a and generate a second pass speech recognition hypothesis (e.g., a final speech recognition result) 120, 120b by improving the first pass speech recognition hypothesis 120a. The first and second pass speech recognition hypotheses 120a, 120b may either correspond to a partial speech recognition result or an entire speech recognition result. Stated differently, the first and second pass speech recognition hypotheses 120a, 120b may either correspond a portion of an utterance 106 or an entire utterance 106. For example, the partial speech recognition result may correspond to a portion of a spoken utterance or even a portion of a spoken term. However, as will become apparent, the ASR model 200 performs additional processing on the second pass speech recognition hypothesis 120b whereby the second pass speech recognition hypothesis 120b may be delayed from the first pass speech recognition hypothesis 120a.

The user device 10 and/or the remote computing device 60 also executes a user interface generator 107 configured to present a representation of the transcription 120 of the utterance 106 to the user 104 of the user device 10. As described in greater detail below, the user interface generator 107 may display the first pass speech recognition hypothesis 120a in a streaming fashion during time 1 and subsequently display the second pass speech recognition hypothesis 120b in a streaming fashion during time 2. Notably, the ASR model 200 outputs the second pass speech recognition hypothesis 120b in a streaming fashion even though the second pass speech recognition hypothesis 120b improves upon the first pass speech recognition hypothesis 120a. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the first pass speech recognition hypothesis 120a. During time 1, the user interface generator 107 presents, via the digital assistant interface 18, a representation of the first pass speech recognition hypothesis 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the second pass speech recognition hypothesis 120b of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the first pass speech recognition hypothesis 120a presented at time 1 with the representation of the second pass speech recognition hypothesis 120b presented at time 2. Here, time 1 and time 2 may include timestamps corresponding to when the user interface generator 107 presents the respective speech recognition result 120. In this example, the timestamp of time 1 indicates that the user interface generator 107 presents the first pass speech recognition hypothesis 120a at an earlier time than the second pass speech recognition hypothesis 120b. For instance, as the second pass speech recognition hypothesis 120b is presumed to be more accurate than the first pass speech recognition hypothesis 120a, the second pass speech recognition hypothesis 120b ultimately displayed as the transcription 120 may fix any terms that may have been misrecognized in the first pass speech recognition hypothesis 120a. In this example, the streaming first pass speech recognition hypothesis 120a output by the ASR model 200 are displayed on the screen of the user device 10 at time 1 are associated with low latency and provide responsiveness to the user 104 that his/her query is being processed, while the second pass speech recognition hypothesis 120b output by the ASR model 200 and displayed on the screen at time 2 leverages an additional speech recognition model and/or a language model to improve the speech recognition quality in terms of accuracy, but at increased latency. However, since the first pass speech recognition hypothesis 120a are displayed as the user speaks the utterance 106, the higher latency associated with producing, and ultimately displaying the second pass speech recognition hypothesis 120b is not noticeable to the user 104.

In the example shown in FIG. 1, the digital assistant application 50 may respond to the question posed by the user 104 using natural language processing. Natural language processing generally refers to a process of interpreting written language (e.g., the first pass speech recognition hypothesis 120a and/or the second pass speech recognition hypothesis 120b) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
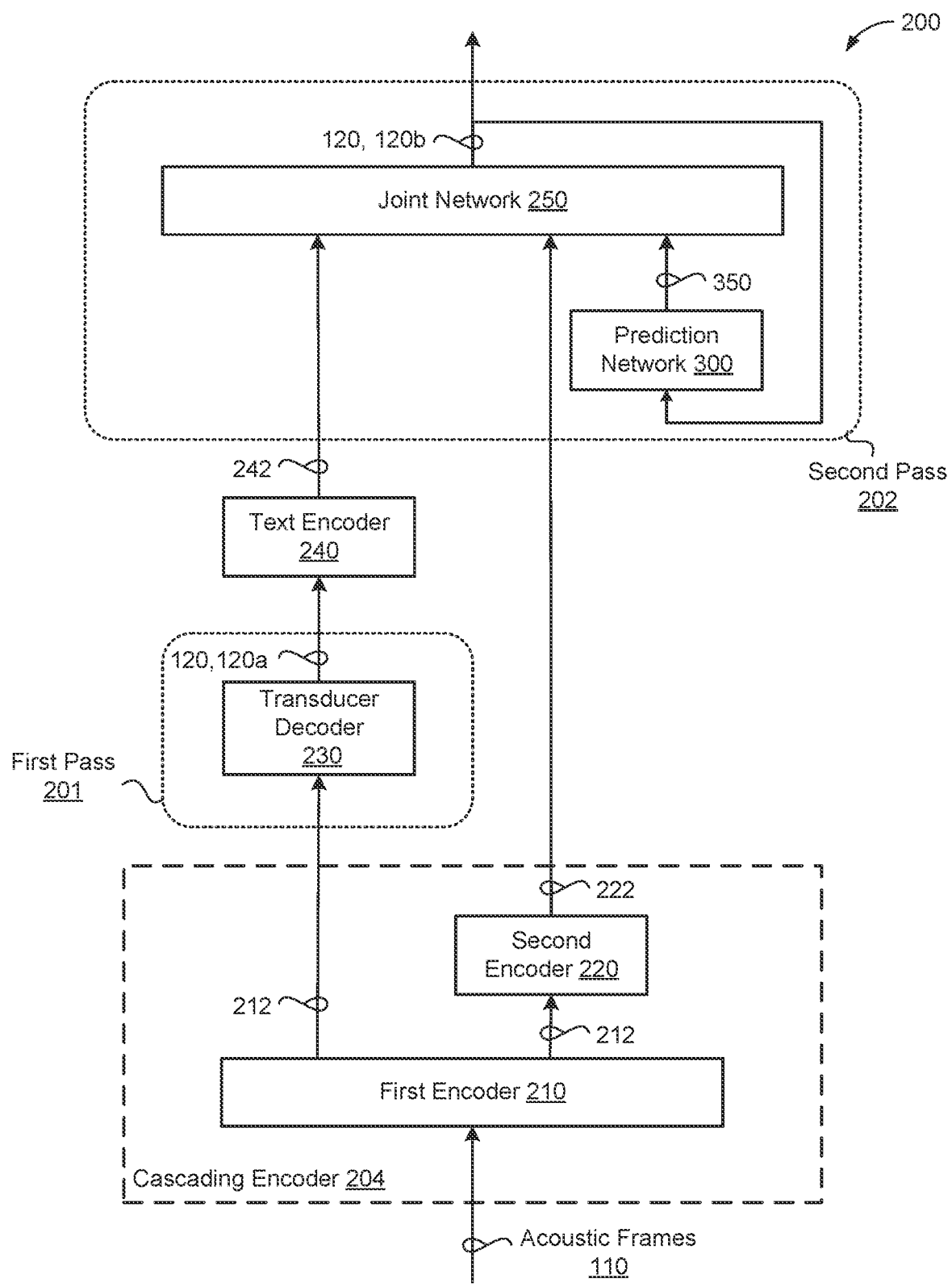
FIG. 2 is a schematic view of an example speech recognition model using transducer-based streaming deliberation.

Referring now to FIG. 2, in some examples, the ASR model 200 is configured for transducer-based streaming deliberation for cascaded encoders. As shown in FIG. 2, the ASR model 200 includes a second pass transducer decoder (i.e., second pass) 202 that improves a first pass speech recognition hypothesis 120a (i.e., initial output) from a first pass transducer decoder (i.e., first pass) 201. In the example shown, both the first pass transducer decoder 201 and the second pass transducer decoder 202 operate in a streaming fashion generating outputs at each output step as inputs are received. Stated differently, the first pass transducer decoder 201 and the second pass transducer decoder 202 do not require receiving or processing an entire input sequence to generate an output thereby operating at a frame-level. Moreover, the ASR model 200 includes a cascading encoder 204 and a text encoder 240 both operating in a similar streaming fashion.

In particular, the ASR model 200 includes a cascading encoder 204, a first pass transducer decoder 201, a text encoder 240, and a second pass transducer decoder 202. Advantageously, using the second pass transducer decoder (e.g., instead of an attention decoder) for the second pass transducer decoder 202 provides a streaming deliberation process to improve the first pass speech recognition hypothesis 120a output from the first pass transducer decoder 201 by generating the second pass speech recognition hypothesis 120b. Here, the first and second pass speech recognition hypotheses 120a, 120b may represent partial speech recognition results including a portion of the words, word-pieces, graphemes, or phonemes from a spoken utterance 106 (FIG. 1).

The cascading encoder 204 refers to a model structure where the encoding pathway includes two encoders 210, 220 that cascade such that the output of a first encoder 210 feeds the input of a second encoder 220 prior to decoding. Here, the first encoder 210 and the second encoder 220 may be cascaded irrespective of the underlying architecture of each encoder. The encoders 210, 220 may each include a stack of multi-head attention layers. In some examples, the stack of multi-head attention layers of the encoders 210, 220 include a stack of 512-dimension conformer layers. In other examples, multi-head attention layers include transformer layers. Optionally, transformer layers may be used in lieu of conformer layers.

The first encoder 210 may be a causal encoder that includes 17 conformer layers each with a multi-headed (e.g., 8 heads) attention mechanism used as a self-attention layer. Moreover, each conformer layer of the first encoder 210 may use causal convolution and left-context attention layers to restrict the first encoder 210 from using any future inputs. On the other hand, the second encoder 220 may be a non-causal encoder that includes 4 conformer layers each with a multi-headed (e.g., 8 heads) attention mechanism used as a self-attention layer. Each conformer layer of the second encoder 220 may use non-causal convolution and right-context attention layer thereby allowing the second encoder 220 to use future inputs. That is, the second encoder 220 may receive additional right context (e.g., 2.88 seconds).

With continued reference to FIG. 2, the first encoder 210 receives a sequence of d-dimensional feature vectors (e.g., sequence of acoustic frames 110) $x=(x_1, x_2 \ldots, x_T)$, where $x_t \in \mathbb{R}^d$, and generates, at each output step, a first higher order feature representation 212 for a corresponding acoustic frame 110 in the sequence of acoustic frames 110. Similarly, the second encoder 220 is connected in cascade to the first encoder 210, and receives the first higher-order feature representation 12 as input, and generates, at each output step, a second higher order feature representation 222 for a corresponding first higher order feature representation 212. However, in some instances, the second encoder 220 generates the second higher order feature representations 222 without receiving any of the acoustic frames 110 as input. In these instances, the second encoder 220 generates the second higher order feature representations 222 using only the first higher order feature representation 212 as input. As shown in FIG. 2, the first higher order feature representations 212 output from the first encoder 210 are fed to the first pass transducer decoder 201 while the second higher order feature representations 222 output from the second encoder 220 are fed to the second pass transducer decoder 202.

In some implementations, the first pass transducer decoder 201 includes a transducer decoder 230. In some configurations, the first encoder 210 of the cascaded encoder 204 resides externally from the first pass transducer decoder 201. In other configurations, the first encoder 210 of the cascaded encoder 204 also resides at the first pass transducer decoder 201 (not shown). The transducer decoder 230 of the first pass transducer decoder 201 is configured to receive, as input, the first higher order feature representations 212 generated by the first encoder 210 and generate, at each output step, a first pass speech recognition hypothesis 120a (y) for a corresponding first higher order feature representation 212.

In some implementations, the first pass speech recognition hypothesis 120a includes a first probability distribution over possible speech recognition hypotheses. Stated differently, the transducer decoder 230 generates, at each output step (e.g., time step), a first probability distribution over possible speech recognition hypotheses. Here, the "possible speech recognition hypotheses" correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the transducer decoder 230 may output a set of values indicative of the likelihood of occurrence of each of a predetermined set of output labels. The set of values can be a vector (e.g., a one-hot vector) and can indicate a first probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The first probability distribution of the transducer decoder 230 can include a posterior probability value for each of the different output labels. Thus, if there are 100 different output labels representing different graphemes or other symbols, the output of the transducer decoder can include 100 different probability values, one for each output label. The first probability distribution can then be used to select and assign scores to candidate orthographic elements (e.g., graphemes, wordpieces, and/or words) in a beam search process (e.g., by a Softmax layer) for determining the first pass speech recognition hypothesis 120a. For example, the transducer decoder 230 may select the N-best possible speech recognition hypotheses having the highest probabilities as output for the first pass speech recognition hypothesis 120a.

The text encoder 240 is configured to receive, as input, the first pass speech recognition hypothesis 120a generated at each of the plurality of output steps and generate, at each output step, a text encoding 242 ($e_y$) for a corresponding first pass speech recognition hypothesis 120a. The text encoder 240 may be a Conformer encoder including multiple right-context Conformer layers. In particular, the text encoder may include a total right-context of R tokens (i.e., frames). The total right-context of the text encoder 240 may be equal to a latency of the second encoder 220. For example, the second encoder 220 may include 2.88 seconds of latency when processing the first higher order feature representation 212. In this example, the total right-context may be set to 2.88 seconds to match the latency of the second encoder 220. In some instances, the text encoder 240 only encodes non-blank tokens from the first pass speech recognition hypothesis 120a whereby the Conformer layers provide contextual modeling from the future. As such, the right-most time frame the text encoder 240 needs to encode may be represented by.

$$r_i = \min(t_{i+R}', T') \qquad (1)$$

In Equation 1, $t_i'$ represents a corresponding output step (e.g., time frame), R represents a total right-context of the text encoder 240, and T' represents a maximum time frame of the first pass speech recognition hypothesis 120a. Notably, the conformer layers of the text encoder 240 use causal convolutions and there is no convolution subsampling performed before the text encoder 240. In some implementations, the text encoder 240 receives the first pass speech recognition hypothesis 120a corresponding to a partial speech recognition hypothesis. That is, because the cascaded encoder 204 and the first pass transducer decoder 201 both operate in a streaming fashion, the resulting first pass speech recognition hypothesis 120a may only correspond to a portion of the utterance 106 (FIG. 1). As such, the text encoder 240 encodes the first pass speech recognition hypothesis 120a that corresponds to a partial speech recognition hypothesis by:

$$e_y(t) = \{e_{y,k} | \text{ where } r_k < t+A \text{ and } k<L\} \qquad (2)$$

In Equation 2, $e_y(t)$ represents the text encoding at each output step (e.g., time step), $e_{y,k}$ represents the kth encoded token in $e_y$, and $r_k$ is the latest output step (e.g., time step) required for encoding the kth token, L represents a total number of tokens in the first pass speech recognition hypothesis 120a (y), A represents a number of look-ahead output steps (e.g., time steps), and t represents the output step of the cascaded encoder 204. More specifically, the text encoder 240 looks ahead by the number of look-ahead output steps A from the current output step of the first pass speech recognition hypothesis 120a. Thus, increasing A will increase the latency of the text encoder 240 by requiring the text encoder 240 to receive enough output steps of the first pass speech recognition hypothesis 120a to satisfy the A look-ahead output steps. On the other hand, decreasing A reduces the latency of the text encoder 240 and the latency bottleneck is at the cascaded encoder 204. As such, A may be equal to the right-context of the cascaded encoder 204 such that the text encoder 240 minimizes latency while also maximizing the output steps used from the first pass speech recognition hypothesis during deliberation.

The second pass transducer decoder 202 may include a joint network 250 and a prediction network 300. The joint network 250 is configured to receive, as input, a dense representation 350 generated by the prediction network 300, the second higher order feature representation 222 generated by the second encoder 220, and the text encoding 242 generated by the text encoder 240. The joint network 250 of the second-pass transducer decoder is also configured to generate, at each output step, the second pass speech recognition hypothesis 120b using the dense representation 350, the second higher order feature representation 222, and the text encoding 242.

In some implementations, the second pass speech recognition hypotheses 120b includes a second probability distribution over possible speech recognition hypotheses. Stated differently, the joint network 250 generates, at each output step (e.g., time step), a second probability distribution over possible speech recognition hypotheses. Here, the "possible speech recognition hypotheses" correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. The set of values can be a vector (e.g., a one-hot vector) and can indicate a second probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The second probability distribution of the joint network 250 can include a posterior probability value for each of the different output labels. Thus, if there are 100 different output labels representing different graphemes or other symbols, the output of the joint network 250 can include 100 different probability values, one for each output label. The second probability distribution can then be used to select and assign scores to candidate orthographic elements (e.g., graphemes, wordpieces, and/or words) in a beam search process (e.g., by a final Softmax layer of the joint network 250 (not shown)) for determining the second pass speech recognition hypothesis 120b. For example, the joint network 250 may select the N-best possible speech recognition hypotheses having the highest probabilities as output for the second pass speech recognition hypothesis 120b.

In some implementations, the prediction network 300 receives, as input, a sequence of non-blank symbols output by the final softmax layer of the joint network 250 and generates, at each output step, a dense representation 350. The joint network 250 receives the dense representation 350 for the previous second pass speech recognition hypothesis 120b and generates a subsequent second pass speech recognition hypothesis 120b using the dense representation 350.

Figure 3:
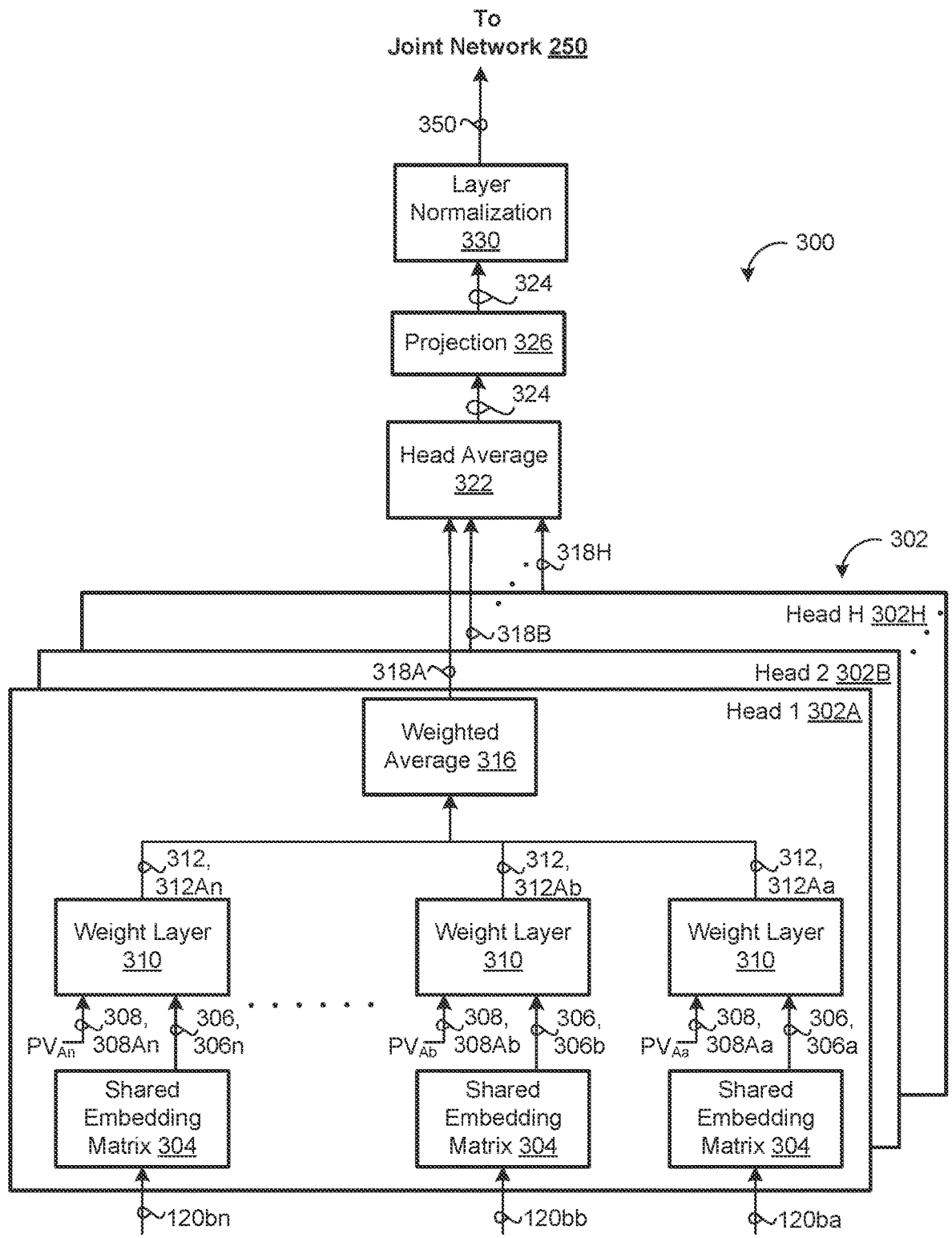
FIG. 3 is a schematic view of an example prediction network of the speech recognition model of FIG. 2.

FIG. 3 shows the prediction network 300 of the ASR model 200 receiving, as input, a sequence of non-blank symbols that is limited to the N previous non-blank symbols output by the final Softmax layer of the joint network 250. That is, the sequence non-blank symbols 120b, 120ba-bn output by the final Softmax layer of the joint network 250 may correspond to non-blank symbols of the second pass speech recognition hypothesis 120b. Thus, the sequence non-blank symbols 120b and the second pass speech recognition hypothesis 120b may used interchangeably herein. The first pass transducer decoder 201 and the second pass transducer decoder 202 may share the prediction network 300. In some examples, N is equal to two. In other examples, N is equal to five, however, the disclosure is non-limiting and N may equal any integer. In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 120b among the sequence of non-blank symbols 120b received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols 120b. The respective position vector PV 308 assigned to each non-blank symbol indicates a position in the history of the sequence of non-blank symbols (e.g., the N previous non-blank symbols output by the final Softmax layer of the joint network 250). For instance, the first position vector $PV_{Aa}$ is assigned to a most recent position in the history, while the last position vector $PV_{An}$ is assigned to a last position in the history of the N previous non-blank symbols output by the final Softmax layer of the joint network 250. Notably, each of the embeddings 306 may include a same dimensionality (i.e., dimension size) as each of the position vectors PV 308.

While the corresponding embedding generated by shared embedding matrix 304 for each for each non-blank symbol 120b among the sequence of non-blank symbols 120b, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308$_{Ba-Bn}$, ..., and the $H^{th}$ head 302 H defines another different row of position vectors $PV_{Ha-Hn}$ 308$_{Ha-Hn}$.

For each non-blank symbol in the sequence of non-blank symbols 120b received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_e (X_{n,e} * P_{h,n,e}) \quad (3)$$

In Equation 3, h represents the index of the heads 302, n represents position in context, and e represents the embedding dimension. Additionally, in Equation 1, H. N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector 350 at the corresponding time step from the plurality of time steps. The prediction network 300 generates only a single embedding vector 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector 350.

Referring back to FIG. 2, at every output step, the joint network 250 also determines an attention context vector $a_t$ between the text encoding 242 (e.g., representing a partial first pass speech recognition hypothesis) and the corresponding frame(s) of the second higher order feature representation 222. In particular, the joint network 250 determines the attention context vector at by using the text encoding 242 as a key and value and using the second higher order feature representation 222 as a query. As such, the attention context vector $a_t$ summarizes the first pass speech recognition hypothesis 120a by querying using the current time frame. Thereafter, the joint network 250 merges the attention context vector $a_t$ with the second higher order feature representation 222 by:

$$c_t = \text{Merge}(a_t, e_x(t)) \quad (4)$$

In Equation 4, $e_x(t)$ represents the second higher order feature representation 222, $a_t$ represents the attention context vector, and $c_t$ represents the output value from the merge operation. Thereafter, the joint network 250 generates the second pass speech recognition hypothesis 120b by combining the output value $c_t$ with the dense representation 350 by:

$$h_{t,u} = \tan h(W_{ch}c_t + W_{lh}l_u + b_h) \quad (5)$$

In Equation 5, $h_{t,u}$ represents the second pass speech recognition hypothesis 120b and $l_u$ represents the dense representation 350. Optionally, a final Softmax layer of the joint network receives the second pass speech recognition hypothesis 120b ($h_{t,u}$) and performs a beam search process to select orthographic elements as the second pass speech recognition hypothesis 120b output from the second pass transducer decoder 202. The final Softmax layer may be integrated with the second pass transducer decoder 202 or separate from the second pass transducer decoder 202.

Notably, the joint network 250 generates the second pass speech recognition hypothesis 120b at each output step, and thus, the second pass speech recognition hypothesis 120b may correspond to a partial speech recognition result or a complete speech recognition result. For example, the sequence of acoustic frames 110 may correspond to the utterance 106 "What is the weather in New York City" (FIG. 1), and the joint network 250 generates a partial second pass speech recognition hypothesis 120b of "What is the weather" because the joint network 250 has only processed inputs corresponding to a portion of the sequence of acoustic frames 110 at that output step. Advantageously, the ASR model 200 by using the second pass transducer decoder 202 for deliberation may attend to future context of the sequence of acoustic frames 110 (e.g., thereby increasing WER performance) while also operating in a streaming fashion (e.g., thereby decreasing latency performance). As such, the ASR model 200 may use deliberation to improve recognition performance while also having a low latency suitable for applications requiring speech recognition in a streaming fashion.

Figure 4:
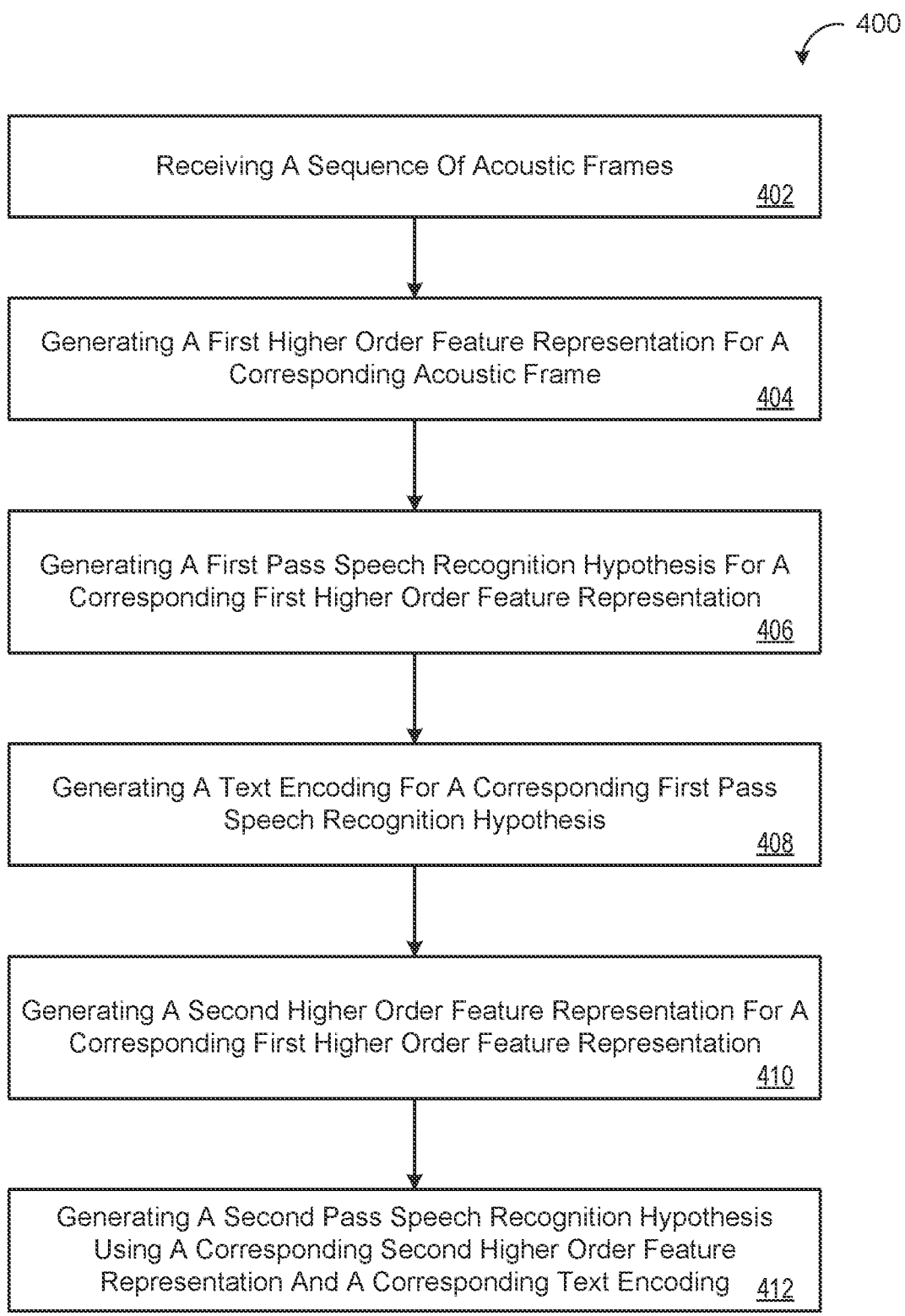
FIG. 4 is a flowchart of an example arrangement of operations for a computer-implemented method of transducer-based streaming deliberation for cascaded encoders.
Figure 5:
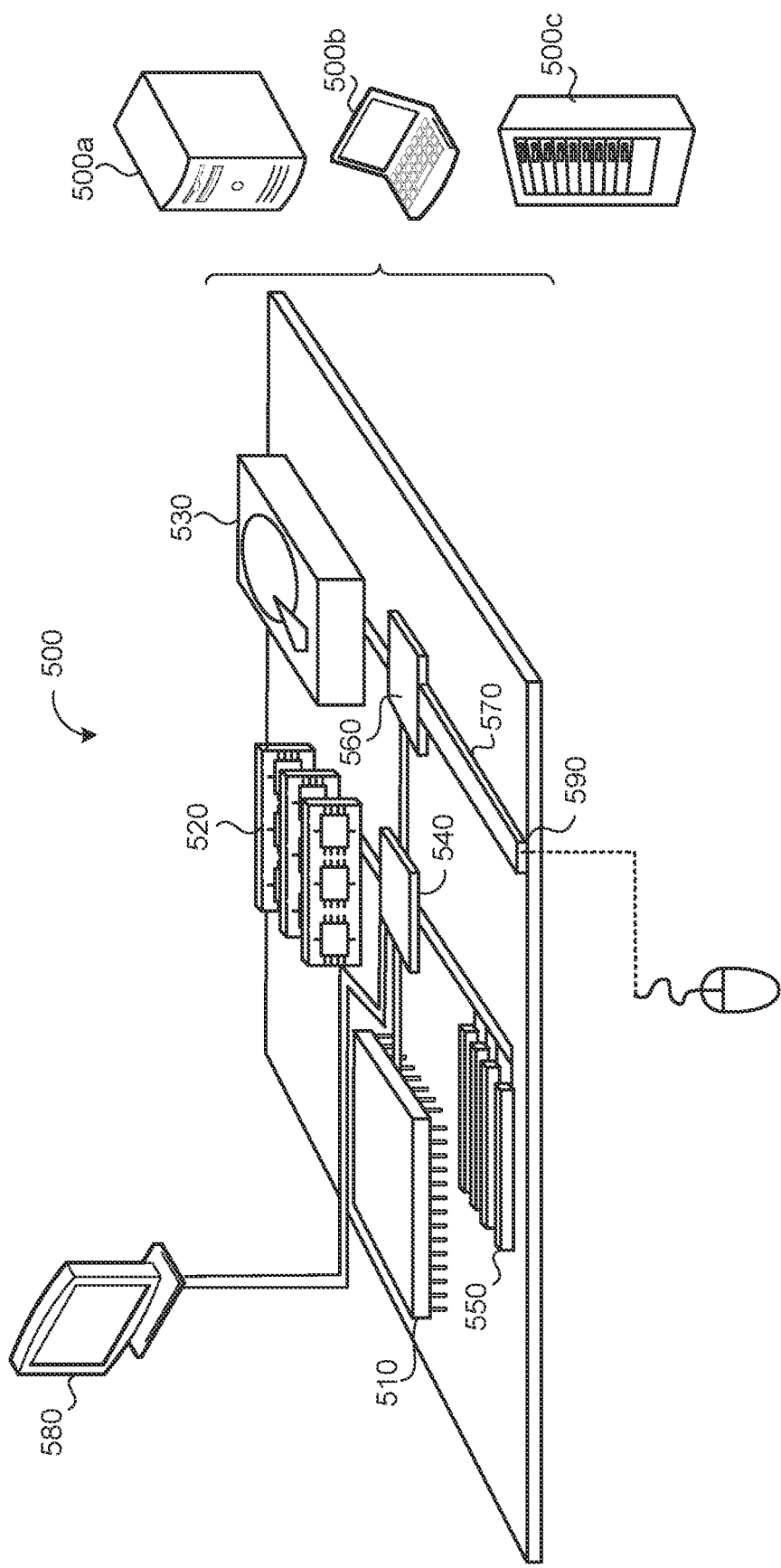
FIG. 5 is a schematic view of an example computing device that may be used to implement the systems and methods described herein.

FIG. 4 is a flowchart of an example arrangement of operations for a method 400 of transducer-based streaming deliberation for cascaded encoders. The method 400 may execute on data processing hardware 510 (FIG. 5) using instructions stored on memory hardware 520 (FIG. 5). The data processing hardware 510 and the memory hardware 520 may reside on the user device 10 and/or the remote computing device 60 of FIG. 1 corresponding to a computing device 500 (FIG. 5).

At operation 402, the method 400 includes receiving a sequence of acoustic frames 110 corresponding to an utterance 106. At operation 404, the method 400 includes generating, by a first encoder 210, a first higher order feature representation 212 for a corresponding acoustic frame 110 in the sequence of acoustic frames 110. Here, the first encoder 210 is connected in cascade to a second encoder 220. The first and second encoder 210, 220 are collectively referred to as a cascading encoder 204. At operation 406, the method 400 includes generating, by a first pass transducer decoder 201, a first pass speech recognition hypothesis 120a for a corresponding first higher order feature representation 212. At operation 408, the method 400 includes generating, by a text encoder 240, a text encoding for a corresponding first pass speech recognition hypothesis 120a. At operation 410, the method 400 includes generating, by the second encoder 220, a second higher order feature representation 222 for a corresponding first higher order feature representation 212. At operation 412, the method 400 includes generating, by a second pass transducer decoder 202, a second pass speech recognition hypothesis 120b using a corresponding second higher order feature representation 222 and a corresponding text encoder 242. Notably, the second pass transducer decoder 202 generates the second pass speech recognition hypothesis 120b in a streaming fashion such that the ASR model 200 outputs each portion of the second pass speech recognition hypothesis 120b as soon as the ASR model 200 generates each portion. Here, the second pass speech recognition hypothesis 120b may include a portion of the words, word-pieces, graphemes, or phonemes from a spoken utterance 106.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A transducer-based deliberation model for cascaded encoders comprising:
   a first encoder configured to:
      receive, as input, a sequence of acoustic frames; and
      generate, at each of a plurality of output steps, a first higher order feature representation for a corresponding acoustic frame in the sequence of acoustic frames;
   a first pass transducer decoder configured to:
      receive, as input, the first higher order feature representation generated by the first encoder at each of the plurality of output steps; and
      generate, at each of the plurality of output steps, a first pass speech recognition hypothesis for a corresponding first higher order feature representation;
   a text encoder configured to:
      receive, as input, the first pass speech recognition hypothesis generated at each of the plurality of output steps; and
      generate, at each of the plurality of output steps, a text encoding for a corresponding first pass speech recognition hypothesis;
   a second encoder configured to:
      receive, as input, the first higher order feature representation generated by the first encoder at each of the plurality of output steps; and
      generate, at each of the plurality of output steps, a second higher order feature representation for a corresponding first higher order feature representation; and
   a second pass transducer decoder configured to:
      receive, as input, the second higher order feature representation generated by the second encoder at each of the plurality of output steps and the text encoding generated by the text encoder at each of the plurality of output steps; and
      generate, at each of the plurality of output steps, a second pass speech recognition hypothesis.

2. The transducer-based deliberation model for cascaded encoders of claim 1, further comprising a prediction network shared by the first pass transducer decoder and the second pass transducer decoder, the prediction network configured to:
   receive, as input, a sequence of non-blank symbols output by a final softmax layer; and
   generate, at each of the plurality of output steps, a dense representation.

3. The transducer-based deliberation model for cascaded encoders of claim 2, wherein the second pass transducer decoder further comprises a joint network configured to:
   receive, as input, the dense representation generated by the prediction network at each of the plurality of output steps, the second higher order feature representation generated by the second encoder at each of the plurality of output steps, and the text encoding generated by the text encoder at each of the plurality of output steps; and
   generate, at each of the plurality of output steps, the second pass speech recognition hypothesis.

4. The transducer-based deliberation model for cascaded encoders of claim 1, wherein the second encoder generates the second higher order feature representation without receiving any of the acoustic frames as input.

5. The transducer-based deliberation model for cascaded encoders of claim 1, wherein the first encoder comprises a causal encoder comprising a stack of multi-headed attention layers.

6. The transducer-based deliberation model for cascaded encoders of claim 5, wherein the stack of multi-headed attention layers comprises a stack of Conformer layers.

7. The transducer-based deliberation model for cascaded encoders of claim 1, wherein the second encoder comprises a non-causal encoder comprising a stack of multi-headed attention layers.

8. The transducer-based deliberation model for cascaded encoders of claim 7, wherein the stack of multi-headed attention layers comprises a stack of Conformer layers.

9. The transducer-based deliberation model for cascaded encoders of claim 1, wherein the second pass transducer decoder trains without using any text-only data.

10. The transducer-based deliberation model for cascaded encoders of claim 1, wherein receiving the text encoding generated by the text encoder at each of the plurality of output steps comprises receiving a partial sequence of the text encoding in a streaming fashion.

11. The transducer-based deliberation model for cascaded encoders of claim 10, wherein the second pass transducer decoder further comprises a joint network configured to determine an attention context vector between the partial sequence of the text encoding and a corresponding portion of the second higher order feature representation.

12. The transducer-based deliberation model for cascaded encoders of claim 1, wherein the first and second pass speech recognition hypotheses each correspond to a partial speech recognition result.

13. A computer-implemented method when executed by data processing hardware causes the data processing hardware to perform operations comprising:
receiving a sequence of acoustic frames;
generating, by a first encoder, at each of a plurality of output steps, a first higher order feature representation for a corresponding acoustic frame in the sequence of acoustic frames;
generating, by a first pass transducer decoder, at each of the plurality of output steps, a first pass speech recognition hypothesis for a corresponding first higher order feature representation;
generating, by a text encoder, at each of the plurality of output steps, a text encoding for a corresponding first pass speech recognition hypothesis;
generating, by a second encoder, at each of the plurality of output steps, a second higher order feature representation for a corresponding first higher order feature representation; and
generating, by a second pass transducer decoder, at each of the plurality of output steps, a second pass speech recognition hypothesis using a corresponding second higher order feature representation and a corresponding text encoding.

14. The computer-implemented method of claim 13, wherein the operations further comprise:
generating, by a prediction network based on a sequence of non-blank symbols output by a final softmax layer, at each of the plurality of output steps, a dense representation,
wherein the first pass transducer decoder and the second pass transducer decoder share the prediction network.

15. The computer-implemented method of claim 14, wherein the operations further comprise, at each of the plurality of output steps, generating, by a joint network, the second pass speech recognition hypothesis based on the dense representation generated by the prediction network at each of the plurality of output steps, the second higher order feature representation generated by the second encoder at each of the plurality of output steps, and the text encoding generated by the text encoder at each of the plurality of output steps.

16. The computer-implemented method of claim 13, wherein the second encoder generates the second higher order feature representation without receiving any of the acoustic frames as input.

17. The computer-implemented method of claim 13, wherein the first encoder comprises a causal encoder comprising a stack of multi-headed attention layers.

18. The computer-implemented method of claim 17, wherein the stack of multi-headed attention layers comprises a stack of conformer layers.

19. The computer-implemented method of claim 13, wherein the second encoder comprises a non-causal encoder comprising a stack of multi-headed attention layers.

20. The computer-implemented method of claim 19, wherein the stack of multi-headed attention layers comprises a stack of conformer layers.

21. The computer-implemented method of claim 13, wherein the second pass transducer decoder trains without using any text-only data.

22. The computer-implemented method of claim 13, wherein receiving the text encoding comprises receiving a partial sequence of the text encoding in a streaming fashion.

23. The computer-implemented method of claim 22, wherein the operations further comprise determining, by a joint network, an attention context vector between the partial sequence of the text encoding and a corresponding portion of the second higher order feature representation.

24. The computer-implemented method of claim 13, wherein the first and second pass speech recognition hypotheses each correspond to a partial speech recognition result.

* * * * *